United States Patent
Liu et al.

(10) Patent No.: US 6,396,980 B1
(45) Date of Patent: May 28, 2002

(54) MULTI-PORT FIBER OPTIC DEVICE WITH V-GROOVE DUAL FIBER COLLIMATOR FOR WDM APPLICATION

(75) Inventors: Yuqiao Liu; Chianchiu Li; Gaofeng Chen, all of Sunnyvale; Peter C. Chang, Mountain View, all of CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 09/488,937

(22) Filed: Jan. 21, 2000

Related U.S. Application Data

(63) Continuation-in-part of application No. 09/255,047, filed on Feb. 22, 1999, now Pat. No. 6,246,812.

(51) Int. Cl.⁷ .............................. G02B 6/26; H04J 14/02
(52) U.S. Cl. .............................. 385/34; 385/31; 385/33; 385/24; 385/52; 385/92; 385/93; 385/65; 385/72; 385/73; 385/83; 359/124; 359/131
(58) Field of Search ................................. 385/31, 33, 34, 385/24, 65, 83, 88, 89, 92, 93, 139, 72, 73, 74, 52; 359/124, 131

(56) References Cited

U.S. PATENT DOCUMENTS

| | | | | |
|---|---|---|---|---|
| 5,706,371 A | * | 1/1998 | Pan | 385/11 |
| 5,796,889 A | * | 8/1998 | Xu et al. | 385/24 |
| 5,809,193 A | * | 9/1998 | Takahashi | 385/79 |
| 5,845,023 A | * | 12/1998 | Lee | 385/33 |
| 6,023,542 A | * | 2/2000 | Pan et al. | 385/24 |
| 6,118,910 A | * | 9/2000 | Chang | 385/16 |
| 6,168,319 B1 | * | 1/2001 | Francis | 385/79 |
| 6,246,812 B1 | * | 6/2001 | Liu et al. | 385/34 |
| 6,272,264 B1 | * | 8/2001 | Li et al. | 385/27 |

* cited by examiner

*Primary Examiner*—Brian Healy
(74) *Attorney, Agent, or Firm*—Wei Te Chung

(57) ABSTRACT

A multi-port fiber optic device (10) includes a dual fiber first collimator (12) which comprises a ferrule (18) with the input fiber (30) and the output fiber (32) therein, a gradient index rod lens (20) adhesively attached to the ferrule (18), and a filter (22) adhesively attached to the lens (20) opposite to the ferrule (18). A second collimator (14) is generally positioned in front of the first collimator (12), includes the similar components thereof while being symmetrical to the first collimator (12) along the middle portion of the whole assembly, except that one of the dual fiber of the second collimator (14) functions idle, thus the pigtail of such a fiber being removed.

7 Claims, 2 Drawing Sheets

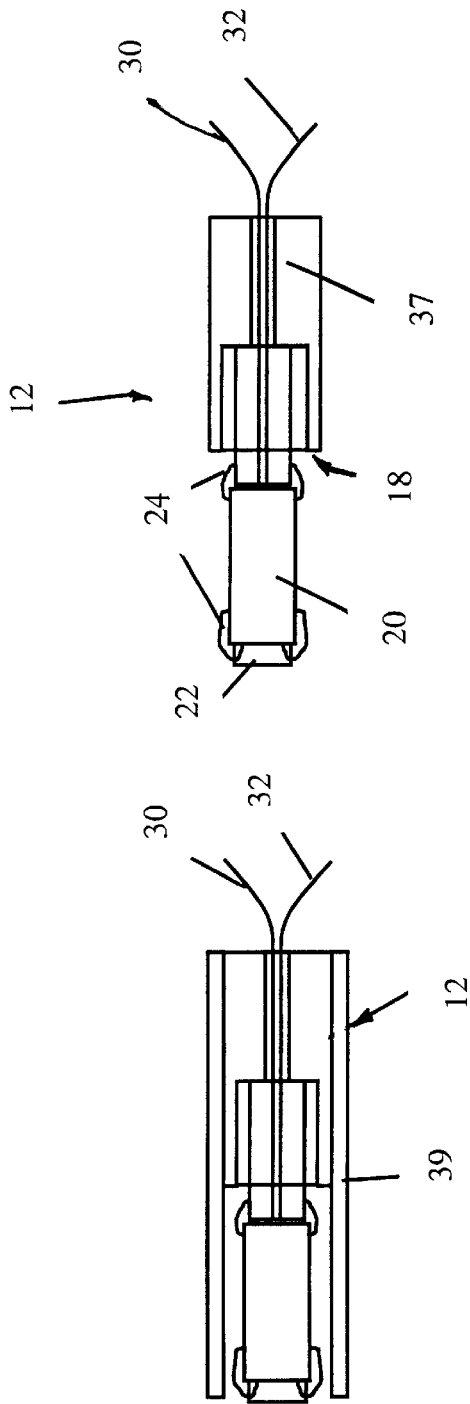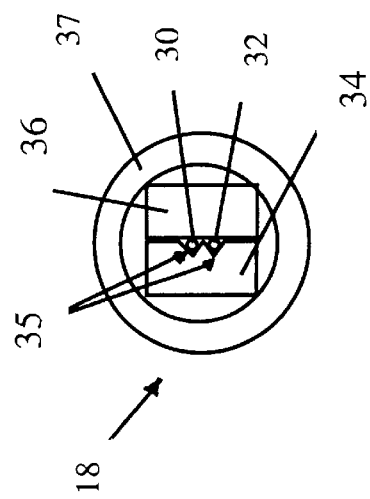

MULTI-PORT FIBER OPTIC DEVICE WITH V-GROOVE DUAL FIBER COLLIMATOR FOR WDM APPLICATION

This is a Continuation-in-Part of the application Ser. No. 09/255,047 filed Feb. 22, 1999, now U.S. Pat. No. 6,246,812.

BACKGROUND OF THE INVENTION

1. Field of the Invention

The invention relates to the technology of making optical DWDM (Dense-Wavelength-Division-Multiplexing) multiplexor or demultiplexor, and particularly to the DWDM multiplexor or demultiplexor with a built-in V-groove dual fiber collimator.

2. The Related Art

The future communication networks demand ever increasing bandwidth. Transmitting several channels in a single optical fiber at different wavelength, DWDM can dramatically enhance the transmission capacity of the optical fiber communication system. The device that combines different wavelength channels into one fiber is a multiplexor, and the device that divides the multiplexed channels into individual ones is a demultiplexor. A variety of technologies has been exploited to develop high performance DWDM multiplexor/demultiplexor, including fiber Bragg grating, optical integrated circuit, fused fiber MachZander interferometer, dichoric coating technology, etc. An International standard wavelength grid has been suggested by the ITU (International Telecommunication Union) for defining the center wavelengths of the DWDM channels.

The traditional way uses a Y-branch structure of three conventional fiber optic collimators wherein the incident angle on the DWDM filter is tuned by changing/adjusting the angles between the collimators, whereby the center wavelength of such a multiplexor/demultiplexor can coincide with the desired ITU wavelength. The disadvantage of this traditional way is mainly with difficulties to reduce the overall size to achieve a robust and compact structure. The related references include U.S. Pat. Nos. 4,464,022, 5,204,771, 5,574,596, 5,629,995, 5,712,717, 5,748,350, 5,764,825, 5,786,915, 5,799,121 and 5,808,763.

Therefore, the invention is to provide a multi-port fiber optic device such as a DWDM multiplexor/demultiplexor, by using at least one dual-fiber collimator therein, for achieving a compact and robust structure, lower cost, flexibility in manufacturing, and high stability in hazardous environment.

SUMMARY OF THE INVENTION

According to an aspect of the invention, a multi-port fiber optic device includes a dual fiber first collimator which comprises two in-and-out optical fibers, arranged in a parallel spatial relation in a chip with a pair of parallel V-shaped grooves therein wherein the distance between such pair of V-shaped grooves is predetermined for compliance with the required incidence angle onto the DWDM filter. A lens is positioned in front of the ends of both the optical fibers. A filter is attached to the front surface of the lens opposite to the pair of optical fibers, which decides the in-pass-band and the out-pass-band of the light wherein the in-pass-band light will penetrate the filter while the out-pass-band light will be reflected to the output optical fiber. A second collimator confronts the first collimator with at least one output optical fiber which transmit the light pass through the filter from the first collimator. A soldering sleeve coaxially enclose both the first and second collimators to finalize the whole package of the multi-port fiber optic device.

BRIEF DESCRIPTION OF THE DRAWINGS

FIG. 2 is a side view of the collimator in the multi-port fiber optic device of FIG. 1 wherein the protective sleeve is cut out to show the internal parts.

FIG. 3 is a side view of the collimator of FIG. 2 without the protective sleeve thereof.

FIG. 4 is a cross-sectional view of the collimator to show how two fibers are retained in the corresponding V-shaped grooves.

DETAILED DESCRIPTION OF THE PREFERRED EMBODIMENT

Figure 1:
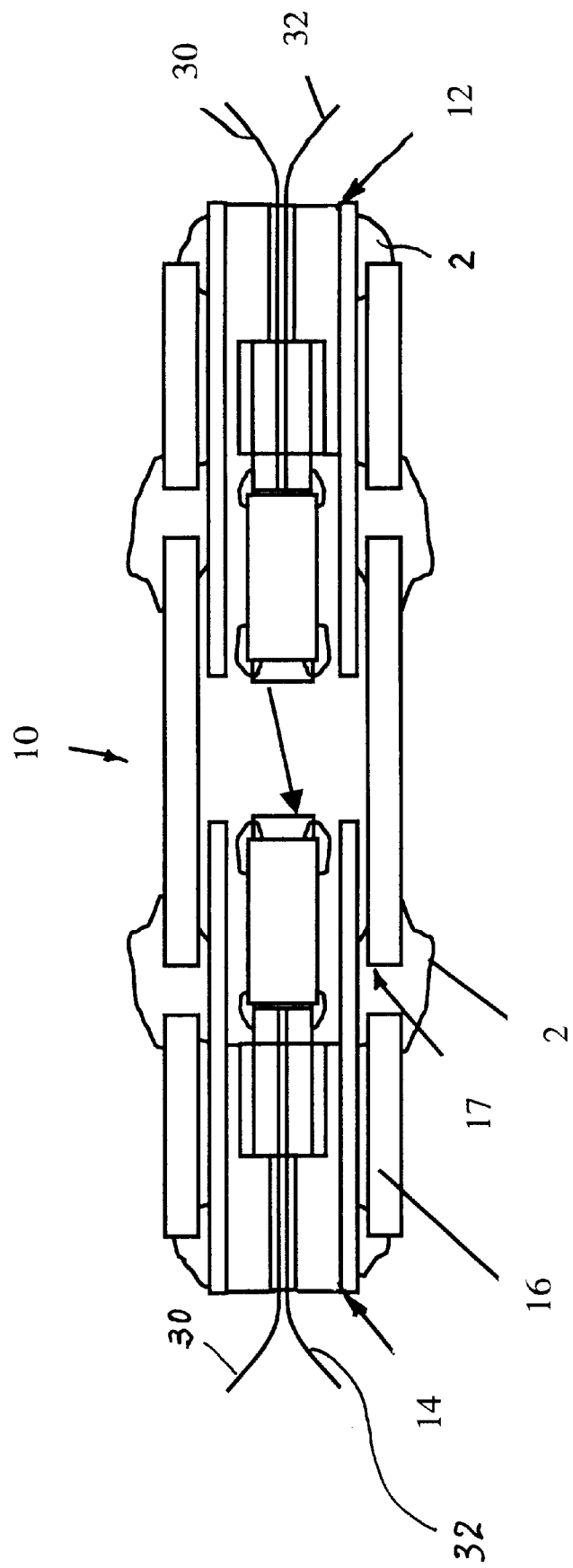
FIG. 1 is a side view of a presently preferred embodiment of multi-port fiber optic device according to the invention wherein the soldering sleeve is cut out to show the internal parts.

References will now be in detail to the preferred embodiments of the invention. While the present invention has been described in with references to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

It will be noted here that for a better understanding, most of like components are designated by like reference numbers therethrough the various figures in the embodiments. Attention is directed to FIGS. 1–4 wherein a multi-port fiber optic device 10 comprises an input first collimator 12 and an output second collimator 14 enclosed coaxially with a soldering sleeve 16.

The first collimator 12 includes axially a ferrule 18 with an input first optical fiber 30 and an output second optical fiber 32 therein, a gradient index rod lens 20 and a filter 22, wherein the filter 22 is directly attached to the front surface of the lens 20 by adhesives 24, and the lens 20 is secured to the ferrule 18 by adhesives 24. It should be noted that the lens 20 has one surface angled relative to its own axis in order to reduce back reflections in the collimator 12. Accordingly, the ferrule 18 is generally aligned with the lens 20 under a condition that their axes are coincided and angled end surfaces are facing to each other.

Before secured with each other by adhesives 24, the relative position between the lens 20 and the ferrule 18 is adjusted to cooperate with the location of the filter 22 where the waists of the two light beams which are collimated into and out of the first collimator 12, i.e, the light beams being respectively transmitted back and forth through the first fiber 30 and the second fiber 32, coincide with each other.

The ferrule 18 of the first collimator 12 comprises a base chip 34 with a pair of V-shaped grooves 35 therethrough along the axial direction of the ferrule 18 which the first fiber 30 and the second fiber 32 are delicately embedded in. A cover chip 36 is disposed upon the base chip 34. A guiding sleeve 37 encloses both the base chip 34 and the cover chip 36 and fasten both chips 34, 36 therein. It is noted that the securement between the lens 20 and the ferrule 18 via adhesives 24 is applied to the interface between the lens 20 and the chips 34, 36.

As mentioned before, the protective sleeve 39 encloses the first collimator 12 and is adhered unto the ferrule 18 while leaves a space or air gap away from the epoxy joints. Thus, the sensitive epoxy joints, i.e., adhesives 24, between the lens 20 and the filter 22, and between the lens 20 and the chips 34, 36, are buffered from the environmental stress or impact.

The second collimator 14 is similar to the first collimator 12 with or without the filter 22 on the lens 20, while is coaxially symmetrically face to face positioned in front of the first collimator 12. The purpose for using a symmetric output collimator 14 is to achieve the minimum insertion loss in alignment while still keeping the symmetric axes of both first and second collimators 12, 14 parallel to each other. This axial arrangement of both the first collimator 12 and the second collimator 14 with each other in the soldering sleeve 16 instead of angular arrangement thereof may reduce the radial soldering gap 40 between the protective sleeve 39 and the soldering sleeve 16 to keep the whole assembly as small as possible, and enhancing thermal stability thereof.

Lastly, the soldering sleeve 16 circumferentially encloses and fastens both the first collimator 12 and the second collimator 14 thereto by means of solder 2 which extends through the holes 17 in the sleeve 16 to cooperate with soldering rings on the protective sleeve 39.

During transmission, a multiplexed DWDM signal is coupled into the device 10 through the pigtail fiber 30 of the input first collimator 12. A part of the signal belonging to the in-pass-band light will pass through the filter 22 as a demultiplexed channel and is coupled/transmitted to the output second collimator 14, while the remaining part of the signal belonging to the out-pass-band light is coupled back, i.e., reflected to, the second fiber 32 of the input first collimator 12 to be transmitted to the next stage for demultiplexing other channels.

Therefore, by properly selecting the spacing between the two fibers 30, 32 through using the selected chip 34 with the proper distance between the pair of V-shaped groove 35, i.e., changing the incident angle of the collimated light beam onto the filter 22, the center wavelength of the DWDM band-pass filter 22 in a DWDM multiplexor or demultiplexor using the so-called dual fiber V-shaped groove collimator technique can be tuned to coincide with the desired/required ITU grid wavelength.

It can be understood that when operated in a reverse manner, the subject device 10 functions as a multiplexor. It is also noted that in the second collimator 14, one of the first fiber and the second fiber is cut short to perform an idle function. This is because the output second collimator 14 only needs one output end to transmit the in-pass-band light. In other words, one only fiber is required in the second collimator. The reason why in this embodiment the second collimator still adopts the dual fibers arrangement and later reform to a single fiber by cutting the exposed portion of one of said dual fibers, is to facilitate to obtain the required refraction angle by adjusting the distance between the dual fibers thereof.

It can be contemplated that the subject multiplexor/demultiplexor is arranged in a relatively small size with easy-to-make manufacturability and performance reliability thereof. This is generally derived from the basic way of dual fibers embedded within the pair of V-shaped grooves disclosed in the copending parent application because it is relatively easy to obtain the pair of grooves with the predetermined distance therebetween so as to allow the corresponding fibers embedded therein to be precisely spaced from each other with the required distance corresponding to the incident angle thereof. Comparably, other approaches to adjust the desired distance between dual fibers for the required incident angle is believed uneconomic and inconvenient.

It can be appreciated that in this embodiment the filter 22 is first attached to the lens 20 by means of adhesives 24 under the condition that the filter 22 abuts against the surface of the lens 20. It means that there is almost no gap or wedge between the lens 20 and the filter 22, thus substantially reducing thermal drift effect therebetween and then assuring a stable optical performance. Afterwards, the lens 20 is aligned and assembled with the ferrule 18 by means of adhesives 24 so that the light entered into the first fiber 30 can be coupled out of the second fiber 32 with the minimum insertion loss. Oppositely, if the lens 20 is first assembled to the ferrule 18 in order to achieve the minimum insertion loss, a wedge or gap may be formed between the filter 22 and the lens 20 during assembling, which tends to induce strong thermal drift, and jeopardize the optical performance.

While the present invention has been described with reference to specific embodiments, the described is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

We claim:

1. A multiplexor/demultiplexor comprising:
   an input first collimator and an output second collimator coaxially enclosed within a protective soldering sleeve;
   the first collimator including a ferrule with an input first optical fiber and an output second optical fiber embedded within a pair of corresponding V-shaped grooves in the ferrule;
   a gradient index rod lens attached to a front portion of said ferrule, said rod lens defining an angled end face confronting the ferrule;
   a filter applied to the lens;
   a guiding sleeve attachably enclosing said ferrule; and
   a protective sleeve attachably enclosing both the lens and the guiding sleeve; wherein
   air gap is formed between the protective sleeve and epoxy joints among the ferrule, the filter and the lens to buffer the collimator from environmental stress or mechanical or thermal impact.

2. The multiplexor/demultiplexor as described in claim 1, wherein the second collimator is symmetrically similar to said first collimator for reducing insertion loss, keeping a small size, and enhancing thermal stability thereof.

3. The multiplexor/demultiplexor as described in claim 1, wherein solder is applied between said soldering sleeve and said protective sleeve.

4. The multiplexor/demultiplexor as described in claim 1, wherein said ferrule includes a base chip with said pair of V-shaped grooves and a cover chip atop the base chip, and adhesives is filled within the space between said guiding sleeve and the combined base chip and cover chip.

5. The multiplexor/demultiplexor as described in claim 2, wherein said second collimator includes another lens and another ferrule of a pair of spaced V-shaped grooves with another pair of optical fiber therein, of which one is aligned through the lens with the output light beam of the first collimator, another idle one is cut short after the alignment is consolidated.

6. A multiplexor/demultiplexor comprising;
an input first collimator and an output second collimator coaxially enclosed within a protective soldering sleeve;
the first collimator including a ferrule with an input first optical fiber and an output second optical fiber embedded within the ferrule;
a gradient index rod lens attached to a front portion of said ferrule, said rod lens defining an angled end face confronting the ferrule;
a filter applied unto the lens;
a guiding sleeve attachably enclosing said ferrule; and
a protective sleeve (39) attachably enclosing both the lens and the guiding sleeve; wherein
the second collimator is symmetrically similar to said first collimator for reducing insertion loss, keeping a small size, and enhancing thermal stability thereof; wherein
air gap is formed between the protective sleeve (39) and epoxy joints (24) among the ferrule, the filter and the lens to buffer the collimator from environmental stress or mechanical or thermal impact; wherein the protective sleeve (39) is spaced away from and is not fixed to said epoxy joints (24).

7. A method for assembling a filter-collimator subassembly, comprising the steps of:
first directly attaching a filter to a first surface of a gradient index rod lens by means of adhesives under the condition of almost no gap or wedge therebetween; and
secondly aligning and assembling a dual fiber ferrule to a second surface of the gradient index rod lens opposite to the first surface by means of adhesives so that an insertion loss between two fibers in said dual fiber ferrule is minimized.

* * * * *